United States Patent [19]
Swanson

[11] 3,772,709
[45] Nov. 20, 1973

[54] PROSTHETIC JOINT

[76] Inventor: Alfred B. Swanson, 2945 Bonnell S.E., Grand Rapids, Mich.

[22] Filed: June 15, 1972

[21] Appl. No.: 263,304

[52] U.S. Cl.................. 3/1, 128/92 C, 128/DIG. 21
[51] Int. Cl. ............................................... A61f 1/24
[58] Field of Search...................... 3/1, 2; 128/92 C, 128/92 CA, 92 R, DIG. 21

[56] References Cited
UNITED STATES PATENTS

| 3,506,982 | 4/1970 | Steffee......................................... | 3/1 |
| 3,688,316 | 9/1972 | Lagrange et al............................. | 3/1 |
| 3,638,243 | 2/1972 | Campbell et al............................. | 3/1 |
| 3,696,446 | 10/1972 | Bousquet et al............................ | 3/1 |
| 2,629,105 | 2/1953 | Woodall........................................ | 3/2 |
| 3,656,186 | 4/1972 | Dee............................................... | 3/1 |

FOREIGN PATENTS OR APPLICATIONS

| 1,047,640 | 7/1953 | France............................. | 128/92 C |

OTHER PUBLICATIONS

"Arthroplasty of the Knee" by L. Shiers, Journal of Bone & Joint Surgery Vol. 36B, No. 4, November 1954, pages 553–560.

M.G.H. Femoral Condyle Replacements, Vitallium Surgical Appliance Catalog, Austenal Medical Div., Howmet Corp., N.Y., N.Y., 1964, page 62.

*Primary Examiner*—Richard A. Gaudet
*Assistant Examiner*—Ronald L. Frinks
*Attorney*—Peter P. Price et al.

[57] ABSTRACT

The prosthesis is surgically implanted in a joint and comprises a proximal and distal member hinged together for essentially unidirectional bending. The proximal member is rigid and includes a yoke portion. The distal member is flexible to provide limited pliability and includes a cylindrical header portion which fits within the yoke and is connected thereto by a pin.

9 Claims, 6 Drawing Figures

PROSTHETIC JOINT

BACKGROUND OF THE INVENTION

1. Field of the Invention

This invention relates to a prosthetic joint which is surgically implanted and more particularly to a prosthesis specifically designed for implanting in a joint such as the elbow.

2. Description of the Prior Art

The prior art includes prosthetic joints utilizing a proximal and distal member pivotally joined together to provide unidirectional bending. They have however always been comprised of similar materials. Typically, the members are comprised of a metal such as stainless steel. A metal joint has one advantage in that it is extremely strong when subjected to various forces. However, its strength is a drawback in certain respects because it will not yield or give when severe twisting or shear forces are applied and the result is the bone or ligaments of the joint tear, break or deteriorate. As an alternative, the members have been made of a pliable material such as silicone rubber. Such a joint overcomes the difficulty encountered in a joint comprised of metal since it will give when subjected to severe twisting or shear forces and has been very successful in the smaller joints such as those of the fingers. The problem here however is that it has little resistance to shear and hence when utilized in larger joints such as the elbow, instead of the bone or ligament failing, the prosthesis fails.

Other problems relate to the way in which the prosthesis is implanted and affixed to the bone. The utilization of screws or other mechanical fasteners is common. Again, these cause eventual failure or tearing of the bone or ligament as a result of their inability to give when subjected to severe forces even though they are generally of short duration.

Still other problems in presently known joint construction concern the inability to evenly distribute the forces along the hinge to avoid stress concentration points. The latter tend to eventually cause breakage or failure of either the bone or prosthetic joint. Yet other drawbacks relate to the overall design of the joint. In many cases, the hinged portions are spherical-like such that the entire joint tends to twist or rotate when so stressed. Also, the contour of the hinged portions are not particularly shaped to enhance complete acceptance and movement of the prosthesis in the body.

SUMMARY OF THE INVENTION

The human joint is a dynamic entity in that it must have sufficient strength and rigidity while at the same time be pliable to absorb relatively severe pressures of short duration. In accordance with the invention, there is provided a surgically implantable prosthetic joint having a first and second member hingedly interconnected to each other by hinge means. One of the members is comprised of a generally flexible material to provide the requisite pliability required in certain instances while the other member is comprised of a generally rigid material to provide the requisite overall strength.

In a narrower aspect of the invention, the proximal member of the prosthesis is comprised of a rigid material such as stainless steel while the distal member is comprised of a flexible material such as silicone rubber. In a joint such as the elbow, the proximal member is embedded in the humerus and is comprised of a stem and yoke portion, the latter being at least partially implanted in the trochlea and capitulum. The distal member is embedded in the ulna and likewise includes a stem portion and a generally cylindrically shaped header portion positioned at least partially in the greater sigmoid cavity for interconnection with the yoke. A pin extends through the yoke and header to join the two together and provide unidirectional bending. A relatively rigid sleeve is positioned in the header portion to protect the flexible distal member from localized forces as well as provide a uniform bearing surface. The shape of the header portion is contoured to glove with the configuration of the greater sigmoid cavity. While the stem of the proximal member is generally straight to match that of the humerus, the stem of the distal member is curved gently to match that of the ulna. Hence the overall shape of the joint itself is designed to enhance its acceptance by the particular bones in question. In addition, the yoke has a width which is large compared to thickness to allow substantially only unidirectional bending and inhibit twisting or turning of the joint.

The utilization of a rigid and flexible member in combination provides the unique advantages of both types of materials. The strength is present in the prosthesis as well as the requisite pliability. The result is a truer and more accurate prosthesis which causes significantly less problems than presently occur. Preferably, the use of mechanical fasteners is avoided by cementing the prosthesis in the respective joint or weaving ligaments about the yoke and header to hold them in place.

DESCRIPTION OF THE PREFERRED EMBODIMENT

Figure 1:
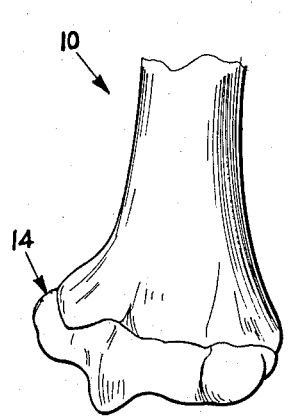
FIG. 1 is a fragmentary anterior view of the humerus and trochlea.

Referring briefly to the drawings, a fragmentary portion of the humerus 10 and ulna 12 are illustrated which portions are normally joined together so that the trochlea 14 of the humerus is received in the greater sigmoid cavity 16 of the ulna. The prosthesis 20 illustrated in FIGS. 3 through 6 is particularly adapted to be positioned in the elbow joint and hence is described hereinafter with particular reference to the humerus 10 and ulna 12. However, the invention is not intended to be so limited since the concepts presented are intended to be equally adaptable to all joints.

Figure 5:
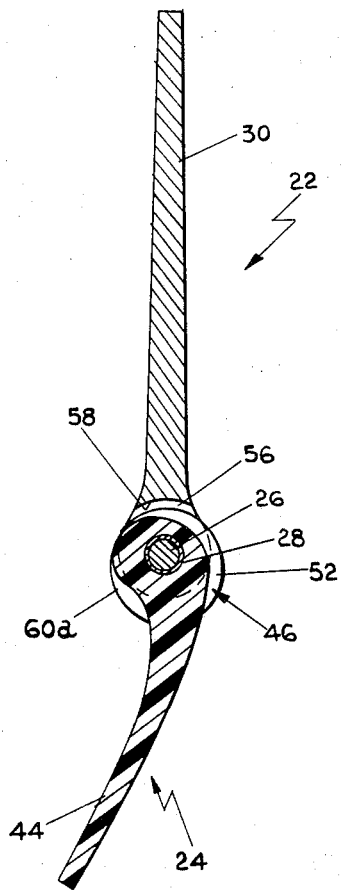
FIG. 5 is a cross-sectional view of the prosthesis shown in FIG. 3 taken along plane V—V.
Figure 6:
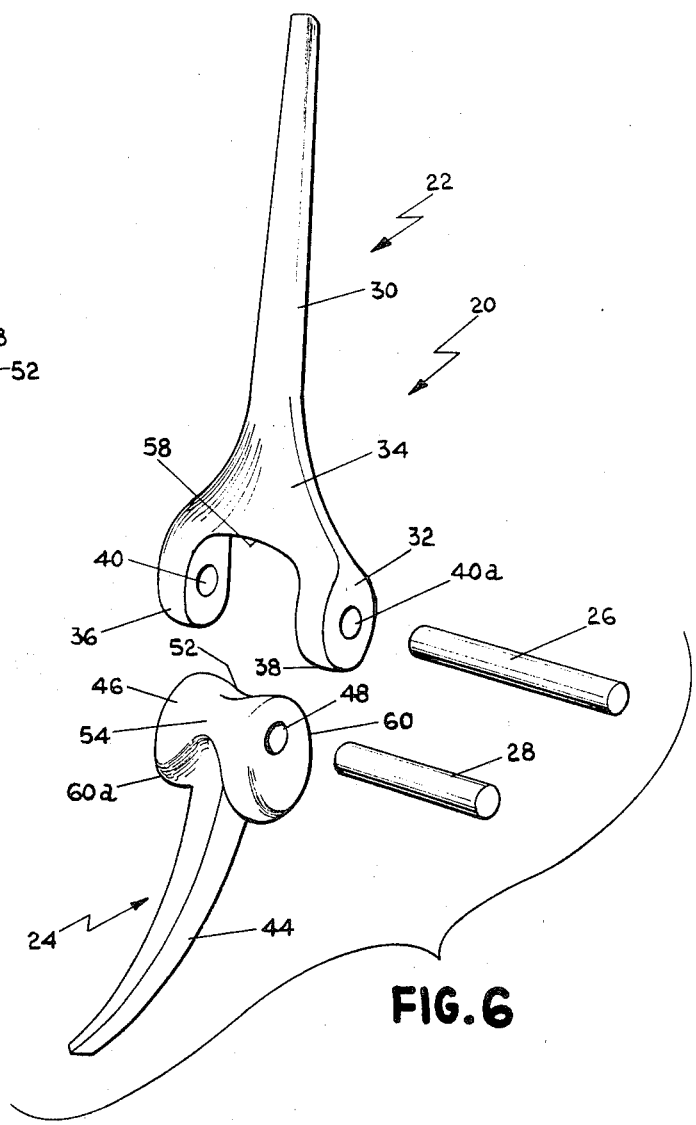
FIG. 6 is a perspective exploded view of the prosthesis provided by the invention.

Referring now to the drawings in detail, FIG. 6 illustrates an exploded view of the prosthesis 20. The prosthesis is comprised of a proximal member 22 and a distal member 24 joined together as shown in FIG. 5 by a pin 26 so that members 22 and 24 may rotate or bend relative to each other about the axis of pin 26. Hence, the bending provided is generally unidirectional. A sleeve 28 is anchored within the distal member 24 to provide sufficient strength and stress relief in the prosthesis as will be described hereinafter.

The proximal member 22 includes a stem portion 30 and a yoke portion 32 at its lower end. Yoke 32 preferably has a width which is large compared to its thickness with a neck portion 34 tapering down to the width of stem 30. The overall configuration of yoke 32 is somewhat rectangular and is designed in this fashion purposefully so that when it is positioned within the lower end of the humerus 10, the flat-wide configuration resists any urgency to twist or turn in the humerus when the elbow joint is subjected to such forces.

Yoke 32 is comprised of a pair of downwardly extending laterally spaced arms 36 and 38 extending from a neck portion 34 which can also be characterized as a web joining arms 36 and 38 together. Each arm includes a laterally extending opening 40 and 40a through the entire width of each arm for receipt of pin 26. The openings as shown are in general alignment with each other. Preferably, the diameter of pin 26 and openings 40, 40a are such that the pin forms a snug fit when positioned through openings 40, 40a. In accordance with the preferred embodiment, pin 26 does not rotate within openings 40, 40a and hence, the snug fit resists axial movement of pin 26 when it is in position. If necessary, the pin should be locked within openings 40, 40a to prevent axial displacement thereof.

The stem portion 30 of proximal member 22 is surgically embedded in the intramedullary canal of humerus 10 and as illustrated in FIGS. 5 and 6 has a slightly decreasing cross-section in the upper direction. That is, the stem has the largest cross-section nearest yoke 32, and its narrowest cross-section at its upper end. This accommodates insertion into the humerus which generally has a declining cross-section from each end to its midsection. Stem 30 is preferably wider than it is thick to prevent the stem along with yoke 32 from twisting or turning in the bone. The stem and yoke of the proximal member are preferably secured to the humerus by either cementing them to the humerus or bone structure, or alternatively, the yoke may be secured in the trochlea and capitulum during surgical implant by manipulation of the joint ligaments.

In accordance with the invention, proximal member 22 is comprised of a rigid material such as stainless steel or Vitallium. The proximal member provides the primary source of strength for the prosthesis implanted in the elbow joint. Under high stress concentrations, the rigidity of the proximal member is counteracted by the flexibility of the distal member which will now be described. The combination of a rigid and flexible member provides a dynamically strong joint which corresponds to the actual characteristics of a joint such as the elbow.

Referring now to FIGS. 3 through 6, the distal member 24 also includes a stem portion 44 for implantment in the intramedullary canal of the ulna. The distal member is comprised of a smooth but irregularly shaped cylindrical-like head portion 46 at its upper end. The greater part of head portion 46 is received in the spacing between arms 36 and 38 of the proximal member. The longitudinally extending opening 48 extends the entire length of header 46 and is alignable in the spacing between legs 36 and 38 with openings 40, 40a to permit insertion of pin 26 to join the proximal and distal member together.

Figure 2:
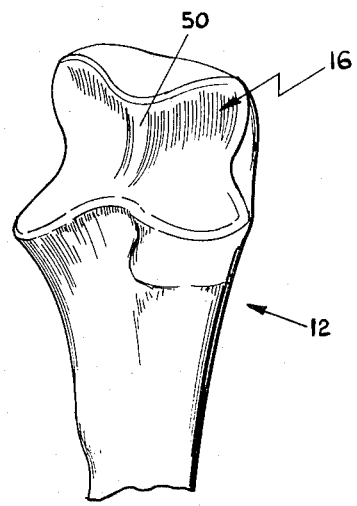
FIG. 2 is a fragmentary anterior view of the ulna and sigmoid cavities.
Figure 3:
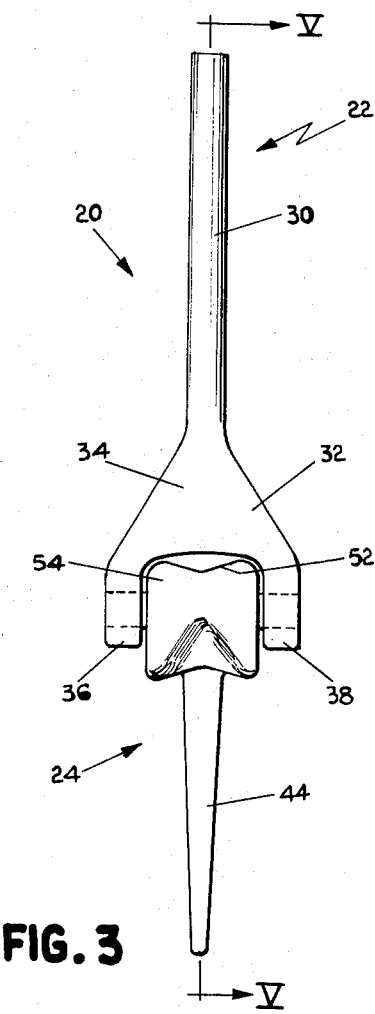
FIG. 3 is an anterior view of the prosthesis provided by the invention.
Figure 4:
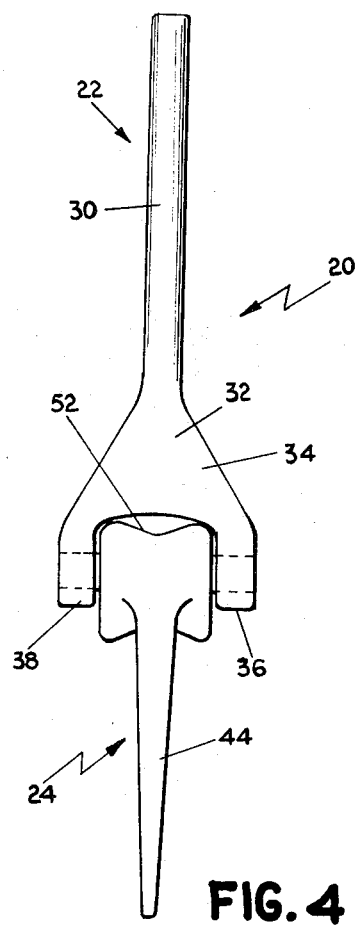
FIG. 4 is a posterior view of the prosthesis shown in FIG. 3.

The outer configuration of header 46 is designed to be implanted at least partially within the greater sigmoid cavity 16 of ulna 12. As noted by the reference 50 in FIG. 2, the greater sigmoid cavity 16 is transversely constricted near its middle. In order to permit movement of header 46 in the greater sigmoid cavity, the outer configuration of header 46 is generally analogous to an hourglass shape such that the greater portion of the midsection of header 46 has a reduced diameter. Thus, a rather shallow annular groove 52 is provided around the mid portion of header 46. The groove 52, however, is interrupted at 54 (FIGS. 3 and 6) on the anterior side of the prosthesis. The groove, of course, is not required at this point since groove 52 is required only essentially on the posterior side for mating with the constriction 50 (FIG. 2) of the greater sigmoid cavity. As noted in FIG. 6, the enlarged portion 54 of header 46 lies slightly above the axial center of header 46 and is generally in alignment with opening 48 which is likewise off center. Opening 48 lies above the geometric center of header 46 so that a substantial portion of header 46 can be implanted in the ulna or greater sigmoid cavity while a similar portion lies upwardly within the spacing between arms 36 and 38.

Referring to FIG. 5, yet another reason for pivotally mounting the distal member to the proximal member above the geometric center of header 46 is illustrated. Depending on the particular degree of deterioration of the elbow joint in which the prosthesis is mounted, a physical limit is desired on the degree of rotation that is possible between the proximal and distal member. In this regard, the optimum design would match that of a normal, healthy elbow joint. In referring to FIG. 5, it is noted that when the proximal and distal member are in a generally aligned position, there is a spacing 56 between the ceiling portion 58 of yoke 32 and the outer periphery of header 46. However, as the distal member is rotated relative to the proximal member, the outer periphery of header 46 at the approximate location of reference numerals 60 and 60a will come into abutment with ceiling 58 to prevent further relative rotation between the proximal and distal member. The position of the prosthesis in FIG. 5 is approximate to that of the left ulna and humerus in a postero-external view. Within approximate limits, rotation of the distal member in a clockwise direction from the position shown in FIG. 5 is preferably limited to approximately 90° whereas rotation in the counterclockwise direction from that shown in FIG. 5 is preferably approximately 30° to 40°. The larger rotation in the clockwise direction corresponds to that of the arm up attitude whereas the counterclockwise rotation corresponds to the arm down and out attitude.

Stem 44 of the distal member is similar to stem 30 of the proximal member in that its cross-section reduces in a direction away from the joint. This is to accommodate its positioning in the intramedullary canal of the ulna. Unlike stem 30, however, stem 44 curves in the anterior direction to conform to the overall configuration of the ulna. The distal member is surgically implanted in the ulna in a fashion similar to the proximal member. That is, the member can be cemented to the ulna or affixed therein by attaching the ligaments around the header portion.

In accordance with the invention, the distal member is preferably comprised of a flexible elastomeric, physiological inert material such as silicone rubber. Such composition provides the prosthesis with a member which permits restrained pliability to accommodate severe stress conditions without causing failure in either the humerus, ulna or prosthesis. The flexibility of the distal member permits the member when subjected to various forces to give to a limited degree in all directions in addition to the general overall unidirectional bending to which the prosthesis is normally subjected. In reality, the elbow joint as is any joint is a dynamic structure. It is constantly subjected to normal bending forces. At the same time shear, torsion and other bending forces are applied to it which would urge the joint to bend in an unnatural manner. In this regard, there must be a certain degree of pliability in order to absorb such forces without tearing or harming the joint. The flexibility of the distal member is designed to provide this capability while the rigidity of the proximal member is designed to provide the overall strength of the prosthesis.

Pin 26 is ideally rigid and preferably comprised of a metal. It may in many instances cause high stress concentrations in certain areas or locations of opening 48 which could cause the distal member to tear or materially deform since it is not highly resistive to shear and twisting forces. To prevent this, a relatively rigid sleeve 28 is mounted within opening 48 extending the entire length of the opening. Sleeve 28 protects the distal member from localized forces and provides a continuous, nonmetallic bearing surface for pin 26 to bear on. The sleeve distributes any twisting forces evenly along the length of opening 48, thus preventing localized forces which might otherwise fracture or distort the head 46. The sleeve, additionally, enhances the ability of the pin 26 to rotate within the distal member 24. Ideally, sleeve 28 is of a rigidity which is substantially greater than the distal member 24 in which it is embedded but less rigid than the proximal member 22. Preferably, sleeve 28 is comprised of a plastic material such as high density polyethylene with the walls being relatively thin. Approximately 1/64 of an inch wall thickness is sufficient.

Upon surgically implanting the prosthesis of the invention, a portion of the bone structure of both the ulna and humerus will preferably closely encapsulate the prosthesis although some resilient movement will be permitted between the ulna bone and proximal portion to prevent bone fracture. Silicone rubber is preferred for the distal member since it is well within the range of tolerance of the human bone.

To summarize, the prosthesis of this invention combines the strength of a rigid material with the pliability of a flexible material in a unique way so that the individual drawbacks of each material are avoided. In addition, the shape and rotational limits of the prosthesis are designed to closely approximate the natural movement of a joint such as an elbow. In addition, the material composition and shape are designed for acceptance by the living bone and flesh in which it is implanted.

Although but one embodiment has been shown and described in detail, it will be obvious to those having ordinary skill in this art that the details of construction of this particular embodiment may be modified in a great many ways without departing from the unique concepts presented. It is therefore intended that the invention is limited only by the scope of the appended claims rather than by particular details of construction shown, except as specifically stated in the claims.

I claim:

1. A prosthetic elbow joint for implanting in the intramedullary canals of the humerous and ulna comprising, in combination: a first member having a yoke, said yoke being generally U-shaped with a pair of spaced arms joined together by a web portion, said arms having means defining axially spaced openings in axial alignment with each other, and an intramedullary stem extending from said web portion of said yoke in a radial direction with respect to the axis of said openings away from said arms; a second member having a generally cylindrical shaped header portion positioned at least partially within said spaced arms, said header portion having means defining an opening extending through its axial width in alignment with the openings in said yoke, said second member having an intramedullary stem extending from said header in a generally radial direction with respect to the axis of said header opening; and a rigid pin positioned through said yoke and header in said openings forming a hinge, said first and second members being rotatable relative each other about the axis of said pin, one of said members being comprised of a rigid material, and the other of said members including its stem being comprised of a resilient pliable material whereby shear, torsion and other bending forces tending to cause the joint to bend in an unnatural manner will be absorbed without damage to the joint and surrounding bone material.

2. The combination according to claim 1 wherein said header opening is positioned off center with respect to the axis of said header portion, the axis of said header opening being spaced from the axis of said header portion in a direction away from said intramedullary stem extending from said header portion.

3. The combination according to claim 1 wherein the cross section of said pin corresponds to the cross section of said openings in said yoke whereby said pin fits snugly within the openings of said yoke such that said yoke does not rotate relative said pin, said header opening being larger in cross section than said pin so that said second portion rotates about said pin relative said first member.

4. The combination according to claim 1 wherein said other member is said second member and wherein said joint member includes a tubular sleeve extending the width of said header, said sleeve being positioned in said header opening, said pin being positioned through said sleeve whereby twisting and shearing forces on said joint are distributed evenly along the sleeve through said header portion, the rigidity of said sleeve being substantially greater than that of the said pliable member.

5. The combination according to claim 4 wherein said sleeve fits snugly within said header portion and said pin fits snugly within the openings within said yoke such that said second member and sleeve rotate jointly about said first member and pin.

6. The combination according to claim 4 wherein said first member and pin are comprised of a rigid metal, said second member is comprised of a flexible elastomeric, physiologically inert material, and said sleeve is comprised of a plastic.

7. The combination according to claim 6 wherein said second member is comprised of silicone rubber.

8. A prosthetic joint for implanting in the intramedullary canals of the adjacent bones comprising, in combination: a first member having a yoke, said yoke being generally U-shaped with a pair of spaced arms joined together by a web portion, said arms having means defining axially spaced openings in axial alignment with each other, and an intramedullary stem extending from said web portion of said yoke in a radial direction with respect to the axis of said openings away from said arms; a second member having a generally cylindrical shaped header portion positioned at least partially within said spaced arms, said header portion having means defining an opening extending through its axial width in alignment with the openings in said yoke, said second member having an intramedullary stem extending from said header in a generally radial direction with respect to the axis of said header opening; and a rigid pin positioned through said yoke and header in said openings forming a hinge, said first and second members being rotatable relative each other about the axis of said pin, one of said members being comprised of a rigid material, and the other of said members including its stem being comprised of a resilient pliable material whereby shear, torsion and other bending forces tending to cause the joint to bend in an unnatural manner will be absorbed without damage to the joint and surrounding bone material.

9. The combination according to claim 8 wherein the other of said members in said second member and wherein said joint further includes a tubular sleeve positioned in the opening of said header and extending the width thereof, said sleeve and header rotating jointly relative to said first member and pin about said pin, said sleeve being comprised of a material substantially more rigid than said second member.

* * * * *